US007850565B2

United States Patent
Junig et al.

(10) Patent No.: US 7,850,565 B2
(45) Date of Patent: Dec. 14, 2010

(54) PLATE-LINK CHAIN

(75) Inventors: Marcus Junig, Bühlertal (DE); Anton Simonov, Bühl (DE); Martin Vornehm, Bühl (DE); Olga Ispolatova, Bühl (DE); Michael Pichura, Bühl (DE)

(73) Assignee: LuK Lamellen und Kupplungsbau Beteiligungs KG, Bühl (DE)

( * ) Notice: Subject to any disclaimer, the term of this patent is extended or adjusted under 35 U.S.C. 154(b) by 471 days.

(21) Appl. No.: 11/452,613

(22) Filed: Jun. 13, 2006

(65) Prior Publication Data

US 2006/0293139 A1    Dec. 28, 2006

Related U.S. Application Data

(60) Provisional application No. 60/690,228, filed on Jun. 14, 2005, provisional application No. 60/758,253, filed on Jan. 3, 2006.

(30) Foreign Application Priority Data

Dec. 24, 2005    (DE)    ........................ 10 2005 062 313

(51) Int. Cl.
F16G 13/04    (2006.01)

(52) U.S. Cl. .................................... 474/215

(58) Field of Classification Search ............... 474/201, 474/214–217

See application file for complete search history.

(56) References Cited

U.S. PATENT DOCUMENTS

| 3,353,421 A * | 11/1967 | Ketterle et al. ............. 474/215 |
| 5,372,554 A * | 12/1994 | Okuda ........................ 474/206 |
| 5,445,570 A | 8/1995 | White ........................ 474/213 |
| 5,464,374 A | 11/1995 | Mott ........................... 474/224 |
| 5,562,559 A * | 10/1996 | Kolhatkar .................. 474/229 |
| 6,393,819 B1 * | 5/2002 | Matsuno et al. ............. 59/35.1 |
| 6,494,800 B1 * | 12/2002 | Kanehira et al. ........... 474/215 |

* cited by examiner

*Primary Examiner*—Robert A Siconolfi
*Assistant Examiner*—Anna Momper
(74) *Attorney, Agent, or Firm*—Alfred J. Mangels

(57) ABSTRACT

A plate-link chain, in particular a toothed plate-link chain, made up of a plurality of plates that form sets of plates which are connected to neighboring sets of plates with a hinged connection. One rocker member of a hinged connection is connected to the plates of a set of plates through a connection opening, and two rocker members of neighboring sets of plates form the hinged connection. The rocker members can roll against each other at a roller profile, and the set of plates includes at least one guide plate. The rocker member includes a guide profile that is connected to a rocker profile through a first connecting profile and a second connecting profile. The guide plate has at least one connection opening which has an undercut or recess in the region of the first and/or second connecting profile.

3 Claims, 5 Drawing Sheets

PLATE-LINK CHAIN

BACKGROUND OF THE INVENTION

1. Field of the Invention

The present invention relates to a plate-link chain and to a guide plate for a plate-link chain.

2. Description of the Related Art

Chains are known in many varieties from the existing art. Chains can be employed, for example, in the frictional transmission of torque in a chain-and-pulley transmission having an endless torque-transmitting means (CVT transmission), and in a positive-connection manner of torque transmission as pin chains, roller chains, or, for example, toothed chains. Such toothed chains can, in turn, have a hinged connection that includes two rocker pressure pieces that roll against each other for each hinged connection.

For example, different types of plates are used in toothed chains, since the chain must be guided transversely to its circulation direction. So-called guide plates are integrated into the chain specifically for those tasks, it being possible in principle to differentiate between internally guided and externally guided toothed chains. Hereby internally guided toothed chains are guided transversely to the circulation direction through special chain links in the region of the middle of their extension. A different possibility is realized in an externally guided chain, where the outermost link plates are of a special design that guides the chain; that is, the guide plates of the chain extend laterally beyond the gear with which they interact.

For those guide plates, in turn, a plurality of embodiments are known from the existing art, which result in part, among other things, from the load, which differs substantially from the load on the other chain links.

Fields of application for such toothed chains include, for example, timing chains, which connect the crankshaft of an internal combustion engine with the camshaft, at least indirectly, and thus control the valves that control the charge exchange process. The execution of such control chains or chain drives is known in the existing art and will not be discussed further here.

Another area of use for such toothed chains is represented, for example, by four-wheel drive concepts, where starting from a power divider transmission a portion of the driving power is conveyed to the rear wheels, for example through a cardan shaft, while the remaining part is conveyed through a chain drive of that sort that runs essentially parallel to the cardan shaft, which then conveys the power to the front wheels.

It is known from the existing art, such as U.S. Pat. No. 5,445,570, for example, to employ a press fit between the guide plate and the entire rocker pressure periphery, which fixes the two parts to each other. That press fit brings about very high stresses in the guide plate at the smallest radii. Furthermore, the reduced rigidity of the edge guide plate with respect to the tooth plate according to the existing art causes uniform elongation of the chain links, and thus a pitch that remains the same in the entire chain. That reduced rigidity is attained in various ways, for example through a deep notch on the axis of symmetry from the upper back of the guide plate, or through a lesser thickness of the guide plate. That notch, for its part, causes the edge plate or guide plate to bend open, because the neutral fiber is in the lower zone, as can also be seen in the drawing figures.

An object of the present invention is to provide a guide plate of a toothed chain having improved elastic properties of the entire plate and of the contact zone with the chain joint.

SUMMARY OF THE INVENTION

The object is achieved by a plate-link chain, in particular a toothed plate-link chain having a plurality of plates, which form sets of plates that are each hingedly connected with neighboring sets of plates. In each case a rocker member of a hinge is connected to the plates of a set of plates through a connection opening, and two rocker members of neighboring sets of plates form the hinge. The rocker members each have a roller profile and can roll or slide against each other. The sets of plates include at least one guide plate, and the rocker member includes a guide profile that is connected to a rocker profile through a first connecting profile and a second connecting profile, wherein the guide plate has at least one connection opening that has an undercut or recess in the region of the first and/or second connecting profile.

A refinement provides for there to be one undercut or recess each to be located in the region of the first connecting profile and the second connecting profile of both rocker members. At least one of the undercuts or recesses can be located in the region of a burr of a rocker member.

The problem stated at the beginning is also solved by a guide plate for a plate-link chain, in particular a toothed plate-link chain, having two connection openings, each to be attached to a pin, in particular a rocker member. The connection openings have large and small radii around their perimeter, with an undercut or recess located in one of the connection openings in at least one region having a small radius of curvature.

The undercut or recess can preferably be at least partially parabolic in shape. Preferably, the connection opening has two regions with small radii of curvature, in each of which there is an undercut or recess.

The problem stated at the beginning is also solved by a guide plate for a plate-link chain, in particular a toothed plate-link chain, having connection openings for attachment to a pin, in particular a rocker member, where the guide plate has a recess on one side and a bulge on the other side between the connection openings, the recess and the bulge being arranged so that a waist occurs between the plane of symmetry and the connection openings.

The problem stated at the beginning is also solved by a transmission having a plate-link chain in accordance with the foregoing description.

In accordance with the present invention, the object is achieved by optimizing the shape of the guide plate in order to reduce the critical stresses. In addition, at some places with especially small radii of curvature a risk of damage from a rolling burr produced in the manufacturing process is reduced by optimizing the shape. The shape optimization is carried out in such a way that the toothed plate elasticity of the edge plate or guide plate is improved, both in regard to pure longitudinal stiffness and in regard to bending open under tension. Contour segments for special undercuts or recesses, which can be described by a parabolic function, are used for that purpose. Those undercuts or recesses are provided at the locations where a rolling burr can be expected. The undercut or recess gives way to a zone of the rocker pressure piece in which there is a slight curvature in the contour of the rocker pressure piece. Consequently, the contact surfaces between the rocker pressure piece and the chain plate is in fact intentionally reduced, but that, in turn, causes the stresses to be reduced, and thus the risk of failure of the chain plate is reduced or even prevented.

A two-fold waisting of the guide plate, both between the axis of symmetry and the bores, makes it possible both to reduce the longitudinal stiffness and at the same time to achieve a slight open bending under tension, which is more comparable to the toothed plates. That slighter open bending results from the fact that the neutral fiber is much less far below the bores, and hence differs significantly from the existing art. At the same time, the guiding property—i.e., the tooth overlapping—is sufficiently preserved. Thus, the elastic properties of the guide plate are adjusted to those of the toothed plate, so that, in turn, they have substantially the same pitch during operation.

BRIEF DESCRIPTION OF THE DRAWINGS

The structure, operation, and advantages of the present invention will become further apparent upon consideration of the following description, taken in conjunction with the accompanying drawings in which.

DESCRIPTION OF THE PREFERRED EMBODIMENTS

Figure 1:
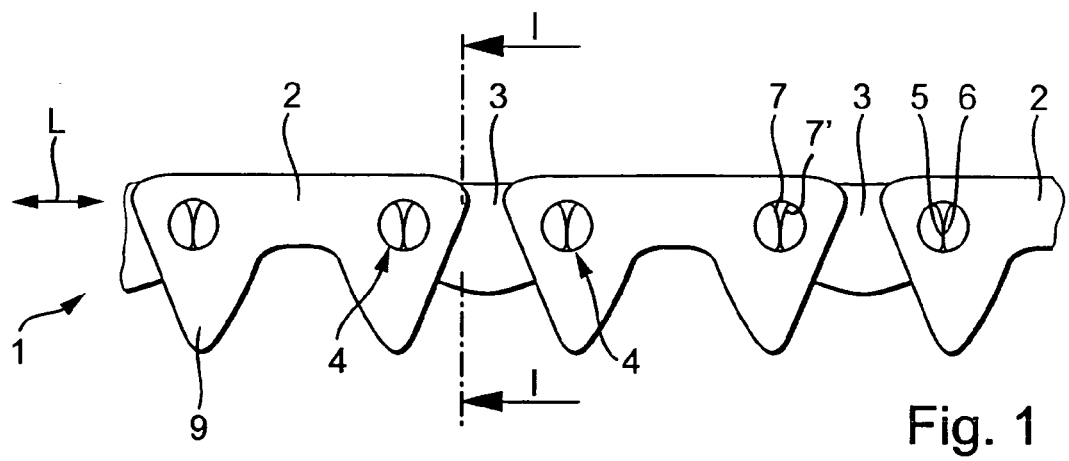
FIG. 1 is a side view of a known plate-link chain.
Figure 2:
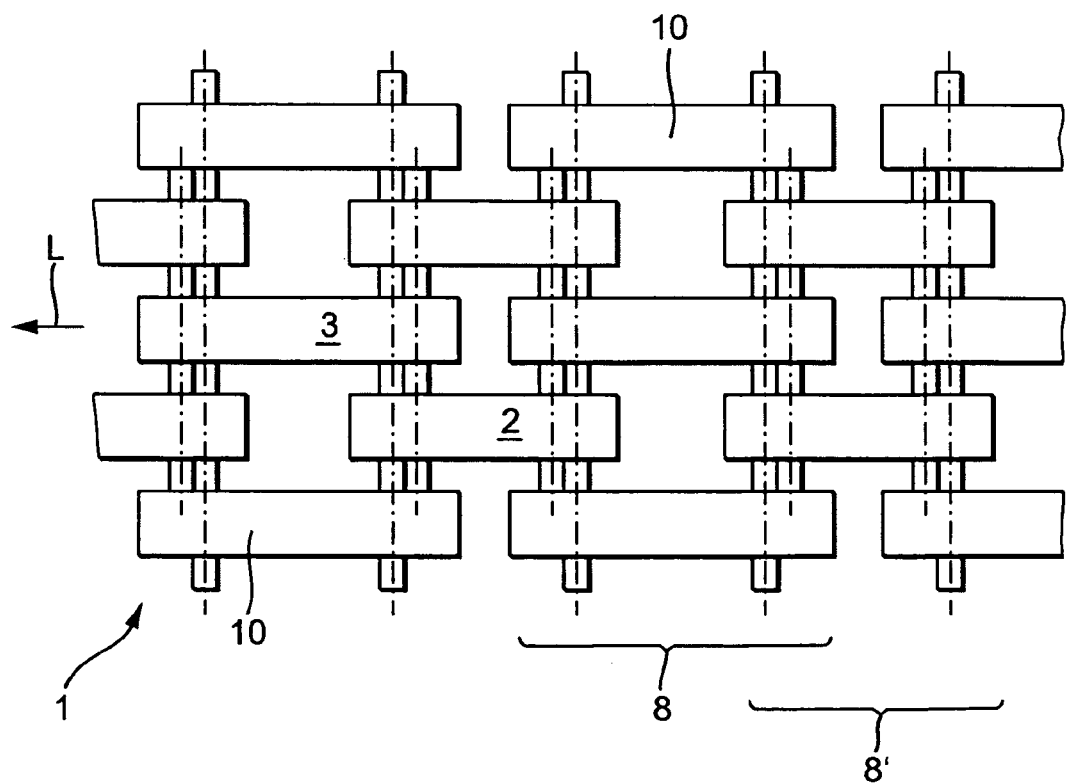
FIG. 2 is a top view of the plate-link chain of FIG. 1.

FIG. 1 shows a side view and FIG. 2 a top view of a plate-link chain according to the existing art, with a two-plate connection. The basic construction of plate-link chains and the terms used in the exemplary embodiments in accordance with the present invention will be explained on the basis of FIGS. 1 and 2. The exemplary embodiments will be described using the example of a plate-link chain having a two-plate connection, but are equally applicable to a plate-link chain having a three-plate connection. Plate-link chain 1 includes a large number of plates 2 and opposed plates 3. Plates 2 and opposed plates 3 are arranged alternately, and are combined into a link with link pins 4. Consequently both ends of a plate are connected to one or two opposed plates by means of a link, and correspondingly both ends of an opposed plate are connected to one or two plates with a link. The link pins 4 can be in one piece, but are preferably in two pieces, with a rocker member 5 being associated with each of the plates and rolling against a rocker member 6 associated with the opposed plate 2. In addition, rocker members 5, 6 each have a roller profile 7 and 7' respectively, with which they can roll or slide against each other. The roller profiles 7, 7' can be identical or different. The plates 2 and opposed plates 3 are set transversely to the direction of running L (that is identified by an arrow with the reference label L), so that an overlapping opposed plate is positioned between two link pins 4 that are arranged side-by-side perpendicular to the running direction L. Conversely, a plate is positioned between and overlaps two opposed plates that are side-by-side transversely in relation to the running direction. Of course that does not apply to the plates 2 or opposed plates 3 that are located on the outside transversely to the running direction L; those have a neighbor on only one side. The sets of plates 3 formed in that way form a chain link 8 by sets; correspondingly, the sets of opposed plates 2 form a chain link 8' by sets. In the present exemplary embodiment the plates 2 and opposed plates 3 can be identical parts, a differentiation between plates 2 and opposed plates 3 being recognizable only by the arrangement. Therefore only plates 2 will be mentioned below, since those are identical to the opposed plates apart from the arrangement in sets. FIG. 2 shows a set of three plates 2 and two opposed plates 3. However, it is also possible to provide sets with any other number of plates 2 and opposed plates 3.

The plates 2 are each provided with plate teeth 9, as can be seen in FIG. 1. With the plate teeth 9, plate-link chain 1 can mesh with a toothed part, for example a gear. The pitch between plates 2 and opposed plates 3 is designed so that when the chain is extended, a uniform pitch results overall between plate teeth 9. The opposed plates 3 are provided with plate teeth 9, so that all of the plates and opposed plates are provided with plate teeth 9. However, it is also possible to provide either only plates 2 or opposed plates 3 with two plate teeth 9, or to provide plates and opposed plates each with only one plate tooth 9. The plate sets are completed on both sides by guide plates 10.

Figure 3:
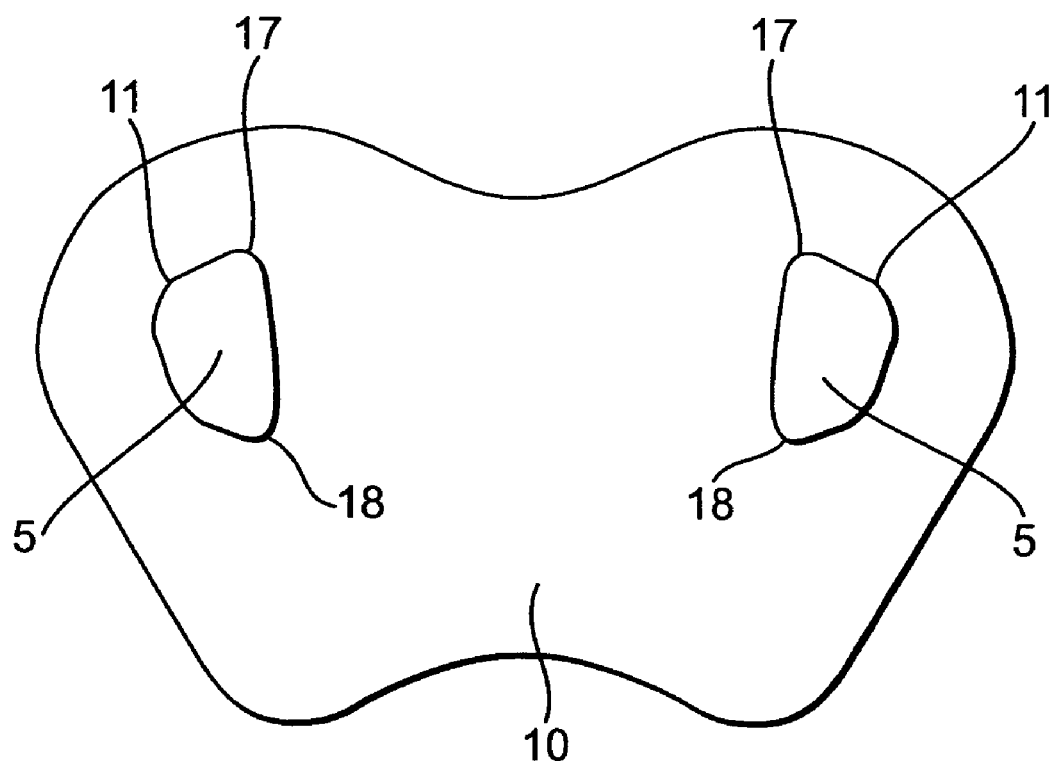
FIG. 3 is a side view of an exemplary embodiment of a guide plate in accordance with the present invention.

FIG. 3 shows a guide plate 10 in accordance with the present invention, having two rocker members 5, each of which is positioned in a respective opening 11. The openings 11 each have a first undercut or recess 17 and a second undercut or recess 18, as will be described below on the basis of FIG. 4.

Figure 4:
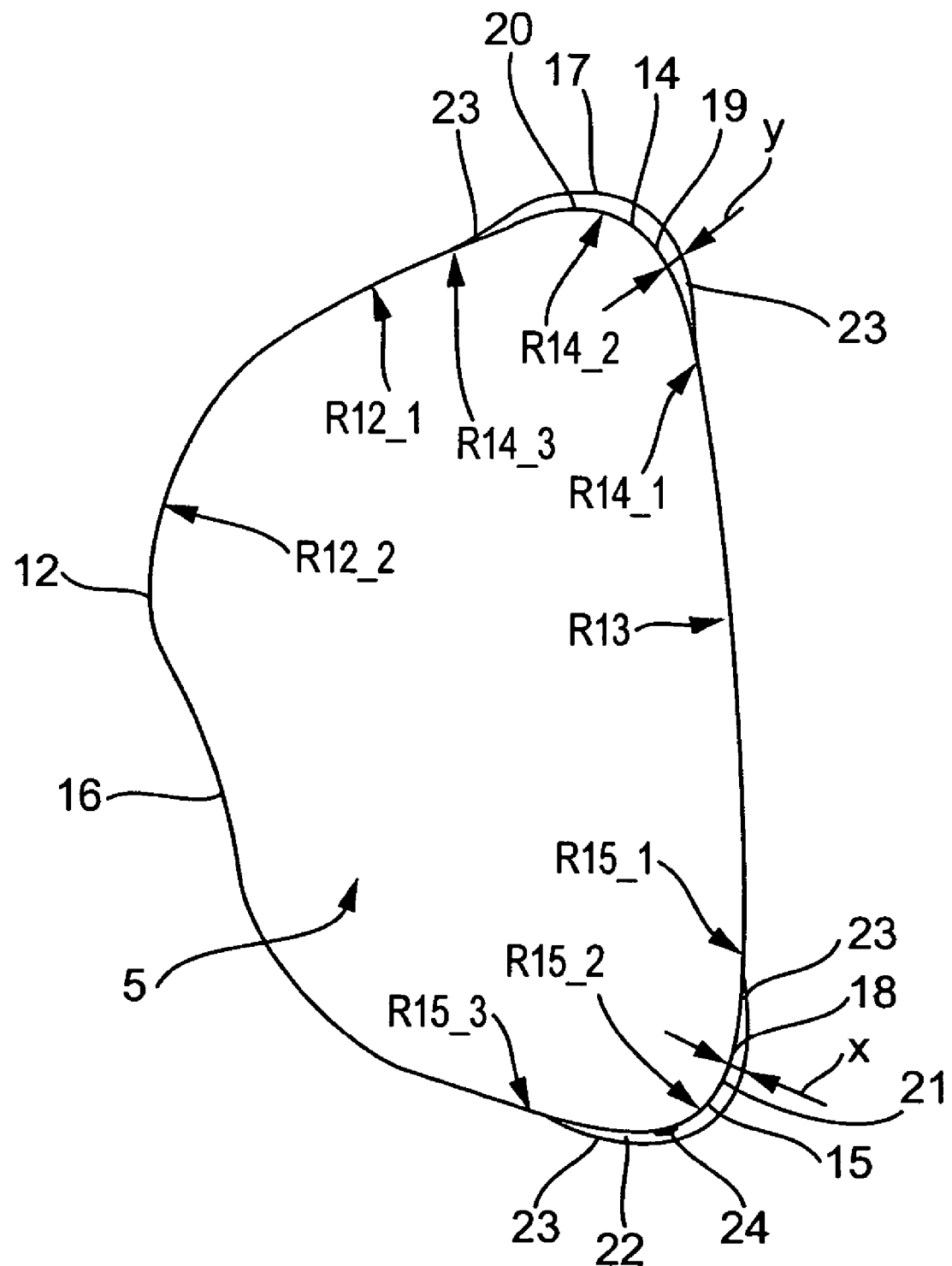
FIG. 4 is an end view of a rocker member and the contour of the associated connection opening of FIG. 3.

FIG. 4 shows an end view of the rocker member 5 and the contour of the corresponding receiving opening 11 of a guide plate 10 shown in FIG. 3. Rocker member 5 includes a guide profile 12, by which it is supported on either the inner plates 2 or the outer guide plates 10 of a chain of the type shown in FIGS. 1 and 2. In addition, rocker member 5 includes a rocker profile R13 with which rocker member 5 can roll or slide on an assigned rocker member 5' of a different plate set 8'. Guide profile 12 and rocker profile R13 are connected through a first connecting profile 14 and a second connecting profile 15. Rocker profile R13 transitions continuously at its two ends to first connecting profile 14 and to second connecting profile 15; the two connecting profiles 14, 15, in turn, transition continuously to the guide profile 12. The first connecting profile 14 has a radius of curvature (or a curvature that can be described by means of radii of tangential circles; the term radius of curvature is also synonymous below for a radius that is represented with radii of tangential circles) that continuously becomes smaller over the length of the periphery of the first connecting profile 14, from a large radius of curvature R14_1 to a minimum radius of curvature R14_2, and then becomes larger again until it reaches a large radius of curvature R14_3, and with that latter radius of curvature it transitions steadily to a radius of curvature R12_1 of guide profile 12. Guide profile 12 also has changing diameters along its periphery, with a minimum radius of curvature R12_2 being significantly larger than the minimum radius of curvature R14_2 of the first connecting profile 14. Guide profile 12 has an indentation 16 to locate rocker member 5.

Corresponding to first connecting profile 14, second connecting profile 15 has a small minimum radius of curvature R15_2 and has a large radius of curvature R15_1 in the region of the transition to the rocker profile R13, and also has a large radius of curvature R15_3 in the region of the transition to the guide profile 12. Here also, the transitions from the second connecting profile 15 to the guide profile 12 and to the rocker profile R13 are continuous.

In the region of the first connecting profile 14 there is a first undercut or recess 17, and correspondingly, there is a second undercut or recess 18 in the region of the second connecting profile 15. The radius of curvature R14_2 is constant, and extends from a starting point 19 to an ending point 20. Correspondingly, the radius of curvature R15_2 is constant, and extends from a starting point 21 to an ending point 22.

In the region of the constant radius of curvature R14_2 the gap width y of the first undercut or recess 17 is constant. Positioned at both ends of the first undercut or recess 17 are parabolic transitions 23 extending to the vanishing point of the gap (a gap width equal to zero).

Corresponding to the first undercut or recess 17, the second undercut or recess 18 has a constant gap width x in the region of the constant radius of curvature R15_2, and likewise passes over at both ends in parabolic transitions 23 to a gap width of zero. FIG. 4 shows a rolling burr 24, which can develop when the rocker member 5 is manufactured. Rolling burr 24 is positioned in such a way that it falls in the region of one of the undercuts or recesses 17, 18; in the present exemplary embodiment burr 24 is in the region of second undercut or recess 18. The undercuts or recesses 17, 18 reduce peaks of stress that can develop in regions of large curvature, that consequently have small radii of curvature.

Figure 5:
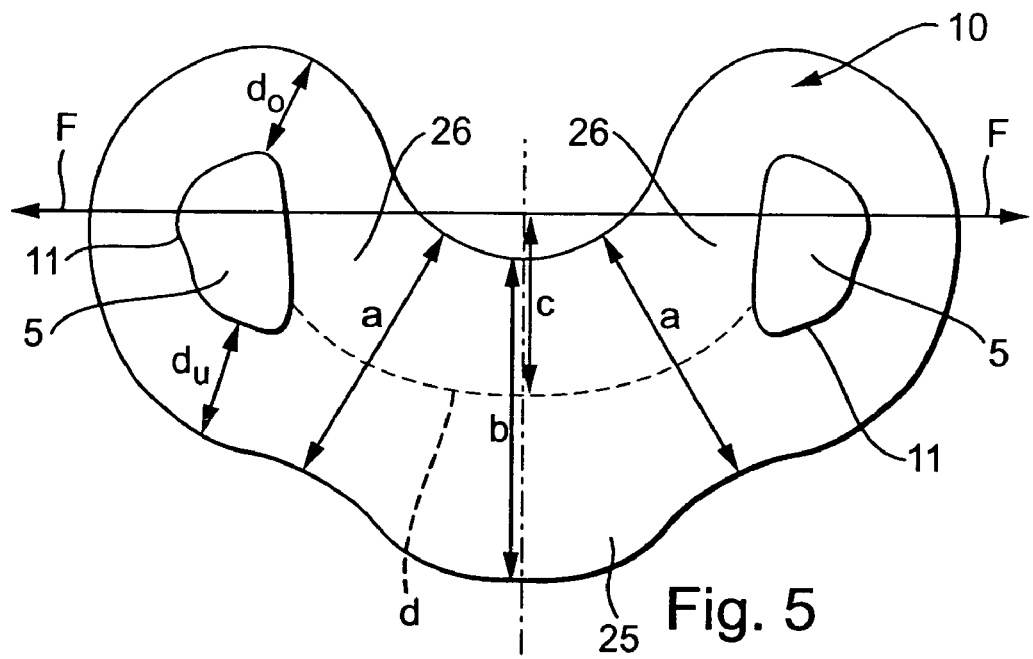
FIG. 5 is a side view of a further exemplary embodiment of a guide plate in accordance with the present invention.
Figure 6:
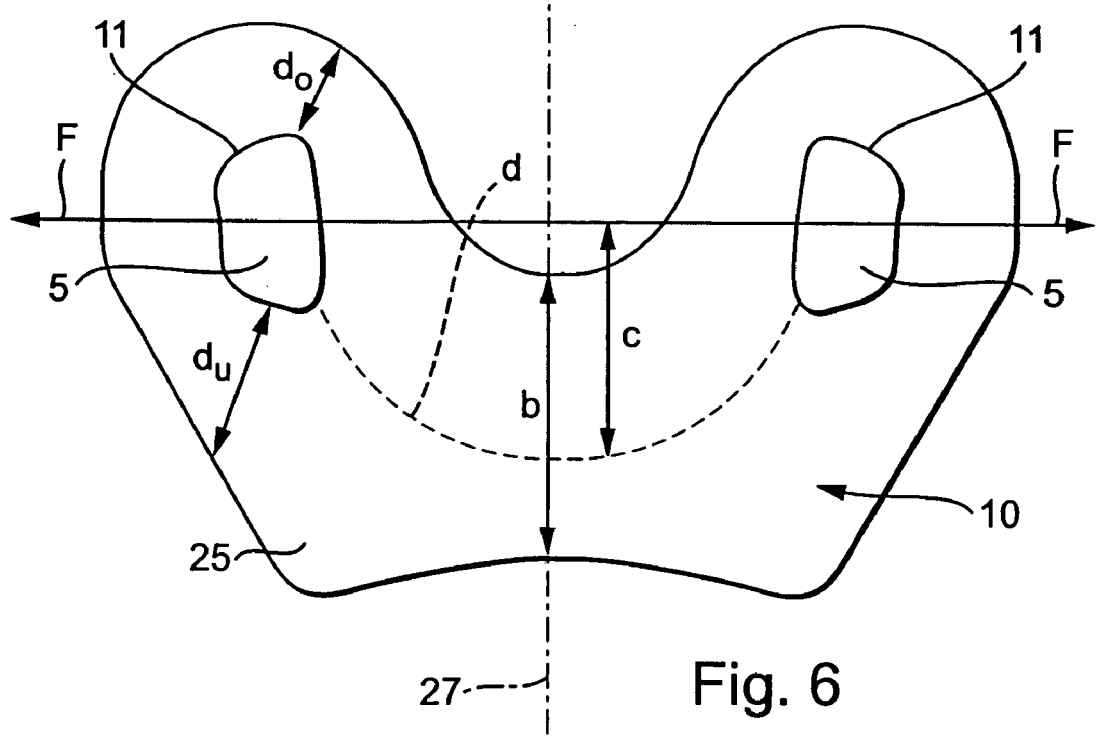
FIG. 6 is a side view of a known guide plate.

FIG. 5 shows a further exemplary embodiment of a guide plate 10 in accordance with the present invention. In comparison, FIG. 6 shows a guide plate in accordance with the existing art. In each case the receiving openings 11 with rocker members 5 positioned within them can be seen. The guide plates 10 each have wings 25, which provide for guiding on a gear the toothed link plate chain on which the guide plates are located. On the toothed plate in accordance with the present invention as shown in FIG. 5, the corner widths $d_o$ and $d_u$ above and below the openings 11 are approximately the same. As can be seen in FIG. 6, that is not the case in the existing art. Outside of the region of the openings 11, the guide plate in accordance with the present invention has waists 26 that extend into the wing 25 at a centerline 27. Thus the width a of the guide plate 10 in the region of the waist 26 is smaller than the width b in the region of the maximum thickness of the wing 25; in the exemplary embodiment in FIG. 5 that maximum thickness b is in the region of the centerline 27.

As can be seen from FIG. 6, on a guide plate 10 according to the existing art the minimum width b of the guide plate is approximately centered between the two rocker members 5, so that it is coincident with the centerline 27. In that respect, on a guide plate according to the existing art the region with the least bending stiffness also falls approximately in the middle of the plate. On a guide plate in accordance with the present invention as shown in FIG. 5, the regions of least bending stiffness fall approximately in the vicinity of the rocker members 5. In FIGS. 5 and 6 the neutral fibers of the two guide plates are shown as a dashed line d. On the guide plate in accordance with the present invention as shown in FIG. 5, the maximum distance c of the neutral fiber d from an imagined line of application of force F by the rocker members 5 is significantly smaller than the maximum distance c for a guide plate according to the existing art. The smaller distance of the neutral fiber d from the application line of the tensile force F causes a smaller open bending of the guide plate, compared to a guide plate according to the existing art as illustrated in FIG. 6.

Figure 7:
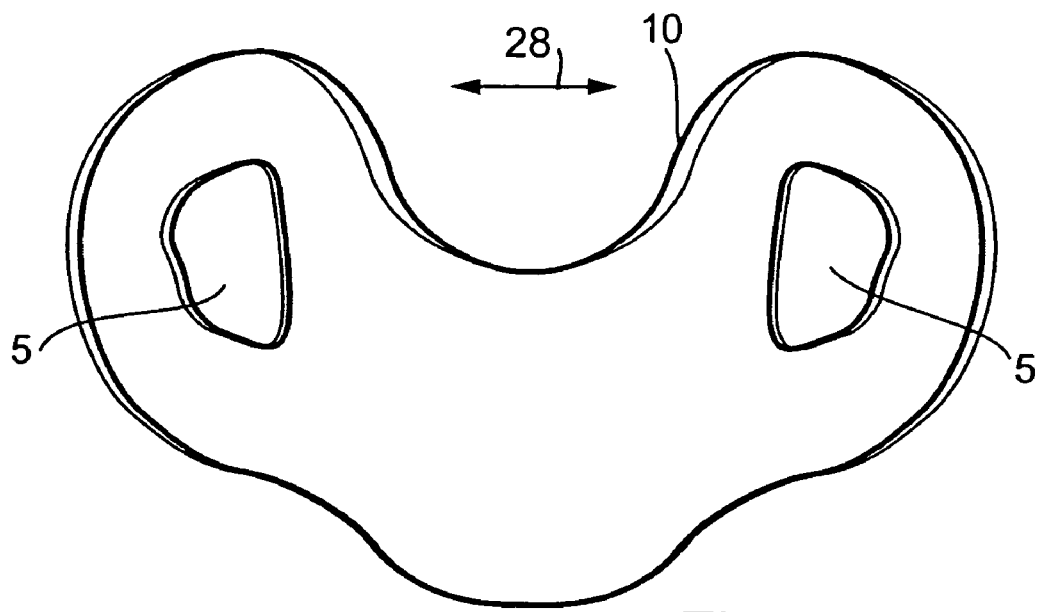
FIG. 7 shows the longitudinal elongation in a guide plate in accordance with the present invention.
Figure 8:
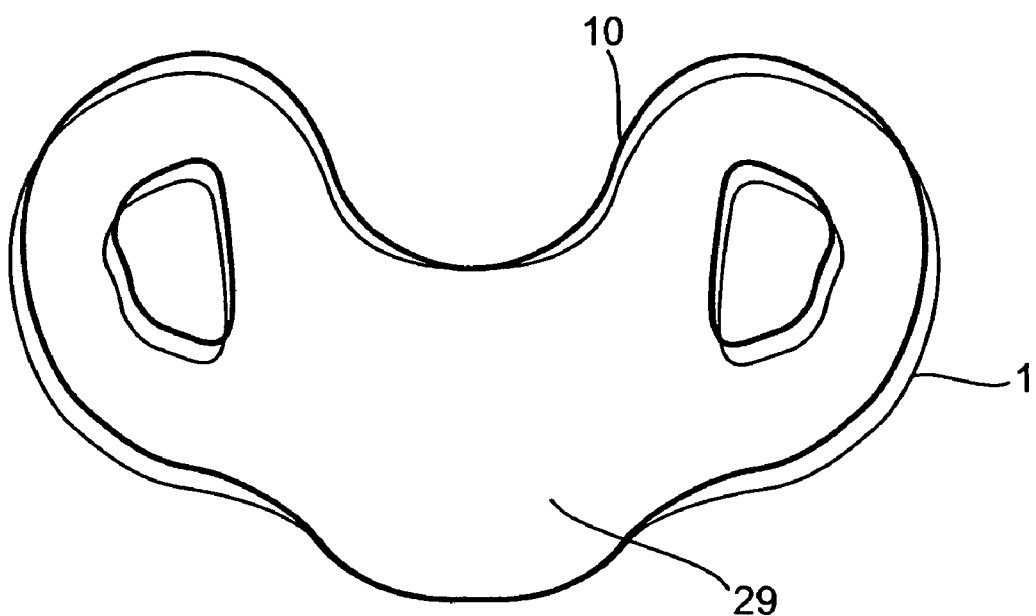
FIG. 8 shows the open bending of a guide plate in accordance with the present invention.

FIG. 7 shows the longitudinal elongation for the guide plate 10 in accordance with the present invention as shown in FIG. 6, and FIG. 8 shows the open bending of such a guide plate. The thicker lines designate the undistorted guide plate 10, the thinner lines the distorted guide plate 10; with the longitudinal elongation as shown in FIG. 7 the rocker members 5 are pulled apart in the direction of the double headed arrow 28 so that the guide plate 10 is elongated as a whole. With the open bending as shown in FIG. 8, essentially a bending toward both sides occurs (rotation) around a point of rotation 29, which lies for example in the region of the neutral fiber approximately in the center of the guide plate. On a guide plate in accordance with the present invention as shown in FIG. 5, in particular the open bending as illustrated in FIG. 8 is reduced compared to a guide plate 10 according to the existing art, because the neutral fiber d is at a smaller distance c from the force application line F, and also because the bending stiffness in the region in which the guide plate 10 has the greatest distance c between the neutral fiber and the force application line is especially high compared to the version in accordance with the existing art.

Although particular embodiments of the present invention have been illustrated and described, it will be apparent to those skilled in the art that various changes and modifications can be made without departing from the spirit of the present invention. It is therefore intended to encompass within the appended claims all such changes and modifications that fall within the scope of the present invention.

What is claimed is:

1. A toothed plate-link chain, said chain comprising: a plurality of plates that form sets of plates, which are connected by a hinged connection with neighboring sets of plates by at least one rocker member, wherein the rocker member of a hinged connection is connected with the plates of a set of plates through a connection opening in the plates and wherein two rocker members of neighboring sets of plates form the hinged connection, wherein adjacent rocker members can roll against each other at a roller profile, wherein the set of plates includes at least one guide plate including a connection opening for receiving only a single rocker member, wherein the rocker member includes a guide profile having outer ends connected to respective ends of a roller profile through a first connecting profile at a first end of the roller profile and having a constant radius of curvature region, and a second connecting profile spaced from the first connecting prone and at a second end of the roller profile, the second connecting profile having a constant radius of curvature region, wherein the connection opening of the guide plate has a guide profile surface that matches and is in surface-to-surface contact with the guide profile of the single rocker member and has a roller profile surface that matches and is in surface-to-surface contact with the roller profile of the single rocker member, the guide plate connection opening including an undercut region opposite each of the connecting profiles of the rocker member to define respective gaps between the first and second rocker member connecting profiles and the opposed undercut regions of the guide plate opening, and wherein the gaps between the first and second connecting profiles of the rocker member and the opposed guide plate opening undercut regions include a constant gap width region at the constant radius of curvature regions of the rocker members, and parabolic transition regions at each outer end of each of the undercut regions of the guide plate openings, wherein the parabolic transition regions terminate at respective contact points between the guide plate opening and the rocker member guide profile and between the guide plate opening and the rocker member roller profile, whereby stresses within the guide plate at the undercut regions are reduced during operation of the chain in a load transmitting mode.

2. A plate-link chain in accordance with claim 1, wherein at least one of the undercut regions is positioned adjacent a roller burr of a rocker member.

3. A transmission having a plate-link chain in accordance with claim 1.

* * * * *